US008666743B2

(12) United States Patent
Schwarz et al.

(10) Patent No.: US 8,666,743 B2
(45) Date of Patent: Mar. 4, 2014

(54) SPEECH RECOGNITION METHOD FOR SELECTING A COMBINATION OF LIST ELEMENTS VIA A SPEECH INPUT

(75) Inventors: Markus Schwarz, Ulm (DE); Matthias Schulz, Westerstetten (DE); Marc Biedert, Illerkirchberg (DE); Christian Hillebrecht, Blaustein (DE); Franz Gerl, Neu-Ulm (DE); Udo Haiber, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 791 days.

(21) Appl. No.: 12/792,384

(22) Filed: Jun. 2, 2010

(65) Prior Publication Data

US 2010/0305947 A1    Dec. 2, 2010

(30) Foreign Application Priority Data

Jun. 2, 2009   (EP) ..................................... 09007310

(51) Int. Cl.
*G10L 15/00* (2013.01)
(52) U.S. Cl.
USPC ............ 704/252; 704/246; 704/247; 704/251
(58) Field of Classification Search
USPC .................. 704/246, 247, 251, 252
See application file for complete search history.

(56) References Cited

U.S. PATENT DOCUMENTS

| 7,392,189 | B2 * | 6/2008 | Hennecke et al. | 704/254 |
|---|---|---|---|---|
| 7,805,299 | B2 * | 9/2010 | Coifman | 704/235 |
| 7,899,671 | B2 * | 3/2011 | Cooper et al. | 704/252 |
| 2004/0034527 | A1 * | 2/2004 | Hennecke et al. | 704/231 |
| 2005/0055210 | A1 | 3/2005 | Venkataraman et al. | 704/255 |
| 2006/0058947 | A1 * | 3/2006 | Schalk | 701/207 |
| 2007/0156403 | A1 * | 7/2007 | Coifman | 704/252 |
| 2008/0177551 | A1 * | 7/2008 | Schalk | 704/275 |

FOREIGN PATENT DOCUMENTS

EP    1 936 606  A1    6/2008 ............. G10L 15/18

OTHER PUBLICATIONS

Venkataraman, A., et al., "An Architecture for Rapid Retrieval of Structured Information Using Speech With Application to Spoken Address Recognition," *IEEE*, Nov. 30, 2003, pp. 459-464.
Schramm, H., et al., "Strategies for Name Recognition in Automatic Directory Assistance Systems," *Speech Communications*, vol. 31, No. 4, Aug. 1, 2000, pp. 329-338.
European Patent Office, Extended European Search Report; Application No. 09007310.7-2225; Sep. 3, 2009.

* cited by examiner

*Primary Examiner* — Leonard Saint Cyr
(74) *Attorney, Agent, or Firm* — Sunstein Kann Murphy & Timbers LLP (57) ABSTRACT

The invention provides a speech recognition method for selecting a combination of list elements via a speech input, wherein a first list element of the combination is part of a first set of list elements and a second list element of the combination is part of a second set of list elements, the method comprising the steps of receiving the speech input, comparing each list element of the first set with the speech input to obtain a first candidate list of best matching list elements, processing the second set using the first candidate list to obtain a subset of the second set, comparing each list element of the subset of the second set with the speech input to obtain a second candidate list of best matching list elements, and selecting a combination of list elements using the first and the second candidate list.

21 Claims, 7 Drawing Sheets

SPEECH RECOGNITION METHOD FOR SELECTING A COMBINATION OF LIST ELEMENTS VIA A SPEECH INPUT

PRIORITY

The present U.S. patent application claims priority from European Patent application 09007310.7 entitled, "Speech recognition method for selecting a combination of list elements via a speech input" filed on Jun. 2, 2009, which is incorporated herein by reference in its entirety.

TECHNICAL FIELD

Embodiments of the invention relate to speech recognition systems, computer program products and methods for selecting a combination of list elements via a speech input. In particular, the invention relates to a speech recognition method for selecting a combination of list elements via a speech input, wherein a first list element of the combination is part of a first set of list elements and a second list element of the combination is part of a second set of list elements.

BACKGROUND ART

In many electronic applications, such as destination guidance or navigation systems for vehicles, telephone systems or audio/video players, a user usually has to select one or more list elements from a database. In the case of a navigation system, for instance, the list elements may correspond to city names, street names or house numbers. Many of these systems can be speech guided or speech controlled by the user, i.e. the user can select a list element from the database by speaking the desired list element.

A speech recognition system for processing voice inputs from a user to select a list element from a list of list elements is known from WO 2004/077405.

For large databases, current systems can only be used to select a single element of the database at a time. Many applications, however, require to select a combination of several list elements. For example, in a navigation system it might be necessary or desired to select a combination of a city name and a street name.

Therefore, a need exists to provide a speech recognition method for selecting a combination of elements from a database using a single utterance.

A straight-forward method which could meet this need may comprise enrolling all valid combinations into a single set of list elements comprising, for instance, all city-street combinations of a given country. According to this example, such a single set of list elements would comprise several millions of entries for a country like France or Germany. Therefore, such a set may not be processed efficiently on a conventional embedded device.

It is therefore, the problem underlying the present invention to overcome the above-mentioned drawback and to provide a computationally efficient speech recognition method for selecting a combination of list elements using a speech input.

SUMMARY OF THE INVENTION

In accordance with embodiments of the invention, a speech recognition method is disclosed for selecting a combination of list elements via a speech input. The combination includes a first list element that is part of a first set of list elements and a second list element that is part of a second set of list elements. The speech recognition system first receives a speech input. Each list element of the first set of list elements is compared with the speech input to obtain a first candidate list of best matching list elements. The second set of list elements is processed using the first candidate list to obtain a subset of the second set. Each list element of the subset of the second set of list elements is compared with the speech input to obtain a second candidate list of best matching list elements. The speech recognition system selects a combination of list elements using the first and the second candidate list. This methodology provides a computationally efficient selection of a combination of list elements via a speech input.

The combination of list elements may correspond to a combination of two or more list elements. The combination may be selected using a single speech input. In particular, the speech input or voice input may be based on a single utterance of a user.

The speech recognition method may be an automatic speech recognition method. In other words, the steps of the method may be performed automatically, in particular, by a computing device or an embedded device.

The list elements may correspond to elements or entries of a database. In particular, the database may comprise a plurality of sets of list elements. The sets of list elements may correspond to lists of list elements, groups of list elements or to differing columns of a single list of list elements.

The list elements of the first set and/or of the second set may correspond to full words. In particular, the list elements of the first set and/or of the second set may not correspond to word fragments. The combination of list elements may not correspond to a composite word or a compound.

The first set and the second set may be disjoint sets or the symmetric difference of the first set and the second set may comprise at least one list element. In other words, the first set and the second set may differ from each other, in particular, in at least one list element. The symmetric difference of two sets is defined as the set of elements which are in one of the sets but not in both.

One or more list elements of the second set of list elements may be related to at least one list element of the first set of list elements. In particular, each list element of the second set may be related to or associated with at least one list element of the first set.

The first set and the second set may correspond to different categories, in particular, wherein each list element of the first set may correspond to a first category and each list element of the second set may correspond to a second category. The first category may differ from the second category.

The first set and the second set of list elements may correspond to different levels of a hierarchy. In particular, the categories of the first set and the second set may correspond to different levels of a hierarchy. In other words, the categories of the first and the second set may be related to each other in a hierarchical way. The list elements of the first set may correspond to a first hierarchical level and the list elements of the second set of list elements may correspond to a second hierarchical level, in particular, wherein the second hierarchical level is lower than the first hierarchical level.

In particular, the list elements of the first and the second set may correspond to hierarchically sorted name data. The list elements of the first and the second set may correspond to geographic terms. In particular, the list elements of the first and the second set, respectively, may correspond to continent names, country names, federal state names, area names, city names, city-district names, street names or house numbers.

The speech input and/or the list elements of the first set and/or the second set may comprise sub-word units, in particular, wherein the speech input and/or the list elements of the first set and/or the second set may correspond to a sequence or a string of sub-word units, in particular to a sequence or string of symbolic representations of the sub-word units. The string of symbolic representations may correspond to a character string. A sequence or string of sub-word units may correspond to a consecutive sequence. The speech input may correspond to the string of symbolic representations of sub-word units. In other words, the speech input may correspond to a character string.

A sub-word unit may correspond to a phoneme, a syllable, an alphanumeric character and/or any combination thereof. For example, the speech input may correspond to a phoneme string.

The speech input may be based on a speech signal originating from a user, wherein receiving the speech input may comprise receiving the speech signal, in particular using one or more microphones. The speech input may be based on or correspond to the received speech signal.

The step of receiving the speech input may be preceded by determining the speech input, in particular based on a speech signal originating from a user. Determining the speech input may comprise receiving the speech signal using one or more microphones and determining one or more sub-word units in the received speech signal. In particular, a speech recognition unit may be configured to recognize sub-word units or speech subunits in the received speech signal.

Determining a speech input may comprise constructing a sequence of sub-word units from the recognized sub-word units in the received speech signal, for example, a sequence of consecutive phonemes, syllables and/or alphanumeric characters. The determined sequence of sub-word units may be converted into a sequence or string of symbolic representations of the sub-word units.

Determining the speech input may further comprise acoustically processing the received speech signal to reduce or eliminate unwanted environmental noises. In this way, the performance of the speech recognition unit may be improved.

The step of receiving the speech input may be followed by selecting the first and the second set from a database based on the speech input and/or by providing the first and the second set of list elements. In other words, the first and the second set may be predetermined sets.

In particular, selecting the first and the second set may comprise comparing each list element of an ordering set with the speech input to obtain a set candidate list, in particular, wherein the first and the second set are selected based on the set candidate list. In this way, the memory requirements of the method may be reduced. In particular, predetermined list elements of the database may be grouped to obtain sets of list elements, wherein each set of list elements is associated with a keyword. The ordering set may comprise the keywords of the sets of list elements. The set candidate list may comprise best matching keywords. Selecting a first set of list elements and/or a second set of list elements may comprise selecting the sets of list elements which correspond to the keyword of the set candidate list, which matches the speech input or a part of the speech input according to a predetermined criterion.

Each of the first set and the second set may correspond to a set union of two or more sets of list elements of the database. This might be particularly relevant if none of the keywords of the ordering set matches the speech input or a part of the speech input according to the predetermined criterion. In other words, the second set may correspond to two or more sets of list elements of the database.

Receiving the speech input may comprise determining the language of the speech input, in particular based on the keyword of the selected first set. One or more steps of one of the above-described methods may be performed based on the determined language of the speech input.

The speech input may comprise two or more distinguishable parts, in particular wherein the two or more distinguishable parts correspond to spoken list elements. The two or more distinguishable parts may be separated from each other by silent pauses. In other words, spoken list elements in the speech input may be separated from each other by silent pauses.

Receiving the speech input may comprise determining a prosodic pattern of the speech input using a pattern classifier trained on prosodic features. In this way, the speech input can be based on a naturally spoken speech signal of a user. In particular, the two or more distinguishable parts of the speech input may be separated from each other by prosodic features.

Comparing the speech input with the list elements of the first set and/or with the list elements of the subset of the second set may comprise selecting best matching list elements from the first set and/or from the subset based on the comparison result. In this way, the first and/or the second candidate list may be obtained.

The second set may comprise a neutral list element, wherein the neutral list element represents the absence of a list element of the second set in the speech input. The neutral list element may be related to all list elements of the first set of list elements.

The speech input may be compared with the list elements of the first set and/or with the list elements of the subset of the second set according to a predetermined criterion.

From the list elements of the second set only the list elements of the subset of the second set may be compared with the speech input. In this way, the efficiency of the method can be further enhanced as the subset of the second set may comprise less list elements than the second set.

Comparing the speech input with the list elements of the first set and/or with the list elements of the subset of the second set may comprise comparing the string of sub-word units of the speech input or a part of the string of sub-word units of the speech input with the string of sub-word units of the list elements. In particular, the string of sub-word units of the speech input may be provided in a way that is suitable for comparing it with the string of sub-word units of the list elements of the first set and/or of the subset of the second set. In particular, the same class of sub-word units may be used for the speech input and the list elements.

For example, if the sub-word units correspond to phonemes, the list elements of the first set, the second set and/or the subset of the second set may be provided as phoneme strings as well. If the list elements are represented in a different way than the speech input, the comparing steps may be preceded by transforming or mapping the representation of the strings of sub-word units of the list elements to the representation of the string of sub-word units of the speech input, for example by using a phonetic transcription.

Best matching list elements of the first set and/or of the subset may be selected according to a predetermined criterion.

Comparing each list element of the first set and/or each list element of the subset of the second set with the speech input may comprise determining for each list element of the first set and/or of the subset of the second set, a score. The score may be a measure for the agreement between the list element and the speech input or a part of the speech input. The score may correspond to a probability, in particular, denoted as a percentage, that the list element corresponds to the speech input or to a part of the speech input.

The first candidate list may be obtained based on the score of the list elements of the first set and/or the second candidate list may be obtained based on the score of the list elements of the subset of the second set. In particular, the first candidate list may comprise list elements of the first set having a score which exceeds a predetermined threshold. Similarly the second candidate list may comprise list elements of the subset of the second set having a score which exceeds a predetermined threshold. The predetermined threshold for obtaining the first candidate list may be equal to or may differ from the predetermined threshold for obtaining the second candidate list.

The first candidate list may be a subset of the first set and/or the second candidate list may be a subset of the second set, in particular, of the subset of the second set.

For comparing the list elements of the first set and/or the list elements of the subset of the second set with the speech input, each list element of the first set and/or of the subset may be extended by at least one wildcard symbol. The at least one wildcard symbol may substitute for a predetermined or arbitrary part of the speech input. A wildcard symbol may be provided on one, both or no side of the list element. Different wildcard symbols may be used on different sides of a list element. In particular, the wildcard symbol may have a predetermined weight. The weight of different wildcard symbols may differ.

Comparing the list elements of the first set and/or of the subset of the second set with the speech input may comprise comparing a predetermined part of the speech input with the list elements. The predetermined part may be determined based on the list element, for example on the length of the list element, and/or on a recognition result, in particular of the speech input, for example, on silent pauses in the speech signal.

The positioning of the at least one wildcard symbol may depend on an assumed position of a part of the speech input corresponding to a category. For example, the speech input may comprise one or more distinguishable parts and the first set of list elements may be associated with a first category. The list elements of the first set may be extended by a wildcard symbol to the right. In this case, it is assumed that a first part of the speech signal is associated with the first category.

Similarly, the list elements of the first list may be extended by a wildcard symbol to the left. In this case, it is assumed that a last part of the speech signal is associated with the first category.

It is to be understood that the first part and/or the last part of the speech signal may be the only part of the speech signal. In other words, the first and/or the last part of the speech signal may comprise the complete speech input.

Comparing the list elements of the first set and/or of the subset of the second set with the speech input may comprise extending a list element of the first set and/or of the subset of the second set to the right by a wildcard symbol, comparing the extended list element of the first set and/or of the subset of the second set with the speech input, thereby obtaining a first score for the list element, extending the list element to the left by a wildcard symbol, and comparing the extended list element of the first set with the speech input thereby obtaining the second score for the list element. In this way, the part of the speech input associated with the first category and/or a second category may be a first part or a last part of the speech input. In the case that the speech input comprises three or more distinguishable parts, the part of the speech input associated with the first category and/or the second category may be a central part.

Alternatively or additionally, a list element of the first set and/or a list element of the subset of the second set may be extended by a wildcard symbol on both sides.

Receiving the speech input may comprise requesting a user to speak an input according to a first category and requesting the user to speak an input according to a second category. In this case, the use of wildcard symbols may be unnecessary for the comparing steps. In other words, the speech input may comprise a first and a second speech input. In particular, the step of requesting the user to speak an input according to a first category may yield a first speech input, wherein comparing each list element of the first set with the speech input may correspond to comparing each list element of the first set with the first speech input. Similarly, requesting the user to speak an input according to a second category may yield a second speech input, wherein comparing each list element of the subset of the second set may correspond to comparing each list element of the subset of the second set with the second speech input.

Processing the second set may comprise selecting only list elements from the second set which are related to one or more list elements of the first candidate list. In this way, relations between sets of list elements may be used to process the second set. In particular, the list elements of the subset of the second set may correspond to list elements from the second set which are related to one or more list elements of the first candidate list.

Processing the second set may be followed by assigning to each list element of the subset of the second set a starting score, wherein the starting score of a list element of the subset of the second set may correspond to the score of the best scored related list element of the first candidate list. In this way, list elements of the subset of the second set, which are related to list elements of the first candidate list having a higher score can be favored, i.e. associated with a higher score.

The number of list elements in the subset of the second set may be smaller than the number of list elements in the second set. In this way, the original size of the second set may be reduced, thereby further improving the efficiency of the method.

The comparing steps may comprise a Levenshtein algorithm, which calculates the least number of edit operations that are necessary to modify one string in order to obtain another string. In this case, the algorithm may calculate the least number of edit operations that are necessary to modify a string of sub-word units of a list element of the first set or of the subset of the second set to obtain the string or a part of the string of sub-word units of the speech input. The algorithm may be terminated if the number of modifications or edit operations for a list element exceeds a predetermined threshold. This mechanism is often termed "pruning" in speech recognition methods.

In particular, the comparing steps may comprise a weighted Levenshtein algorithm. In this case, the scores of the list elements may be normalized. In particular, a threshold or limit for the normalized score may be used for the weighted Levenshtein algorithm.

Determining a score for each list element of the subset of the second set may be based on the starting score of the list element.

Selecting a combination of list elements may comprise determining combinations of a list element of the first candidate list with a related list element of the second candidate list, scoring each determined combination, in particular, by combining the score of the list element of the first candidate list and the score of the related list element of the second candidate list, and determining a result list wherein the result list comprises best matching combinations of a list element of the first set and a list element of the second set. In other words, list elements of the result list may correspond to combinations of a list element of the first set and a list element of the second set.

Each determined combination may comprise a list element of the first candidate list and a related list element of the second candidate list. In particular, each determined combination may comprise only one list element of the first candidate list and only one list element of the second candidate list. The determined combinations may comprise differing combinations, in particular comprising different or differing list elements of the first candidate list and/or different or differing list elements of the second candidate list.

Scoring each determined combination may comprise subtracting from the list element of the second candidate list, the starting score associated with the list element and/or adding the score of the list element of the first candidate list and the score of the related list element of the second candidate list.

Scoring each determined combination may be based on a priori knowledge about the determined combination. In this way, scoring each determined combination can be based, for example, on information about user preferences or the like. In particular, the score of a predetermined combination may be increased or decreased according to a predetermined criterion.

Determining a result list may be followed by comparing each combination of the result list with the speech input, thereby obtaining a pruned result list, in particular, wherein comparing each combination with the speech input comprises determining for each combination a score. The score may be a measure for the agreement between the combination and the speech input or a part of the speech input. In this way, the result list may be further shortened. In other words, the selection of the combination of list elements can be refined. Comparing each combination with the speech input may comprise using wildcard symbols.

Alternatively or additionally, list elements of the result list may be used as vocabulary for a further speech recognition method applied to the speech input to obtain a pruned result list, wherein the further speech recognition method may be based on a Hidden Markov Model or on an artificial neural network. In this way, best matching combinations from the result list may be selected. In particular, list elements of the result list may be used as the only vocabulary for the further speech recognition method.

The vocabulary for the further speech recognition method may comprise additional vocabulary, in particular, wherein each element of the additional vocabulary is related to one or more list elements of the first set and/or the second set.

The first candidate list, the second candidate list, the result list and/or the pruned result list may comprise a maximum number of list elements. The maximum number may differ for the first candidate list, the second candidate list, the result list and the pruned result list.

The number of list elements or the maximum number of list elements of the first candidate list, the second candidate list, the result list and/or the pruned result list may be determined based on the length of the speech input. For example, the longer the speech input, the lower the number or maximum number of list elements of the first candidate list, the second candidate list, the result list and/or the pruned result list may be chosen. In this way, computational resources may be saved.

The first candidate list may be augmented by list elements of a further set of list elements, wherein the further set of list elements may correspond to a hierarchy level between the hierarchy level of the first set and the hierarchy level of the second set, and wherein each list element of the further set of list elements is related to at least one list element of the first set of list elements. The further set of list elements may correspond to a subset of the first set.

A list element of the second set may be related to a list element of the further set and/or to a list element of the first set. In particular, a list element of the second set may be related to a list element of the first set only via a list element of the further set. In this case, memory space may be saved. The list elements of one or more subsets of the second set may be related to one or more list elements of the further set and/or of the first set.

Alternatively or additionally, the second candidate list may be augmented by list elements of a further set of list elements, wherein the further set of list elements may correspond to a hierarchy level lower than the hierarchy level of the second set and wherein each list element of the further set of list elements is related to at least one list element of the subset of the second set of list elements. The further set of list elements may correspond to a subset of the second set. The further set for augmenting the second candidate list may differ from the further set for augmenting the first candidate list.

Augmenting the first candidate list and/or the second candidate list may comprise adding list elements of one or more further sets of list elements, which are related to a list element of the first candidate list and/or of the second candidate list. It is to be understood that the relation between the list elements of the further set of list elements and the list elements of the first candidate list and/or of the second candidate list can but may not necessarily be a direct relation such as, for example, in the case of a city-district-street relation.

Augmenting the first candidate list and/or the second candidate list may comprise assigning a score to the added list elements. In particular, an added list element may be assigned the score of the related list element of the first set and/or of the second candidate list, in particular of the related list element of the first candidate list and/or of the second candidate list.

Selecting a combination of list elements may comprise correcting the score of one or more list elements of a result list for a bias introduced by augmenting the first candidate list and/or the second candidate list. Selecting a combination of list elements may comprise adding a combination of list elements to the result list, in particular wherein a first list element of the added combination stems from or is out of the first set of list elements and is related to a part of a list element of the result list. The part of the list element of the result list may be a list element of a further set of list elements. The further set of list elements may correspond to the further set of list elements discussed above in the context of augmenting the first candidate list.

Alternatively or additionally, selecting a combination of list elements may comprise adding a combination of list elements to the result list, in particular wherein a second list element of the added combination stems from or is out of the subset of the second set of list elements and is related to a part of a list element of the result list. The part of the list element of the result list may be a list element of a further set of list elements. The further set of list elements may correspond to the further set of list elements discussed above in the context of augmenting the second candidate list.

Selecting a combination of list elements may further comprise scoring the added combination. The steps of each of the above described methods may be performed repeatedly, in particular for selecting two or more combinations of list elements. The steps of each of the above described methods may be performed iteratively and/or recursively.

In particular, each of the above described methods may comprise selecting a combination of more than two list elements via a speech input. In this case, the processing and the comparing step may be performed for each further list element of the combination recursively.

For example, a speech recognition method for selecting a combination of three list elements via a speech input, wherein a first list element of the combination is part of a first set of list elements, a second list element of the combination is part of a second set of list elements and a third list element of the combination is part of a third set of list elements, may include the following steps. First the speech input is received into the speech recognition system. The speech recognition system compares each list element of the first set of list elements with the speech input to obtain a first candidate list of best matching list elements. The second set is processed using the first candidate list to obtain a subset of the second set. Each list element of the subset of the second set is compared with the speech input to obtain a second candidate list of best matching list elements. The third set is processed using the second candidate list to obtain a subset of the third set. Each list element of the subset of the third set is compared with the speech input to obtain a third candidate list of best matching list elements. The speech recognition system selects a combination of list elements using the first, the second and the third candidate list.

Each of the above-described speech recognition methods for selecting a combination of list elements may correspond to a speech recognition method for recognizing a combination of list elements in the speech input.

Each of the above-described speech recognition methods may be used for controlling a navigation system, a telecommunication system, a personal digital assistant and/or a multimedia entertainment system such as an audio/video player, in particular, in a vehicle.

In particular, embodiments of the invention further provides a speech control method for controlling a navigation system, a telecommunication system, a personal digital assistant and/or a multimedia entertainment system comprising selecting a combination of list elements, via a speech input, according to one of the above-described methods.

The invention may also be embodied as a computer program product, comprising one or more computer readable media having computer executable instructions for performing the steps of one of the above described methods, when run on a computer.

An embodiment of the invention further provides an apparatus for speech recognition for automatically selecting a combination of list elements via a speech input, according to one of the above-described methods, wherein a first list element of the combination is part of a first set of list elements and a second list element of the combination is part of a second set of list elements. The apparatus includes a speech input for receiving the speech input. The apparatus also includes a first comparison module for comparing list elements of the first set of list elements with the speech input and a processing module for processing the second set of list elements based upon the first candidate list. Additionally, the apparatus includes a second comparison module for comparing list elements of a subset of the second set with the speech input producing a second candidate list. Finally, the apparatus includes a selection module for selecting a combination of list elements from the first and second candidate lists.

Embodiments of the invention further provide a system for automatic speech recognition comprising at least one microphone configured to receive a speech signal of a user and an above described apparatus for speech recognition for automatically selecting a combination of list elements. The system may correspond to a navigation system, a telephone system, a personal digital assistant and/or a multimedia entertainment system. The system may be a hands-free system, in particular, a hands-free speech control system, in particular, for use in a vehicle. The system may comprise a speech signal processor configured to perform noise reduction and/or echo cancelling.

The system may further comprise acoustical output and/or a display to output the result list or the pruned result list.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

A database may be provided in a speech recognition system, wherein the database may comprise two or more lists or sets of list elements. The user may select a combination of list elements from the database using a spoken utterance of a wanted or a desired combination of list elements.

For example, the speech recognition method may be used in combination with a navigation system and a first set of list elements may correspond to a set of city names, a second set of list elements may correspond to a set of street names and a third set of list elements may correspond to a set of house numbers. According to a different example, the different sets of list elements may comprise album names, artist names or song titles. In this case, the speech recognition method may be used in combination with an audio player for selecting a desired song from a desired album of a desired artist.

In another example, a speech recognition method for selecting a combination of list elements may be used to select a contact from an address book. In this case, the different sets of list elements may, for example, comprise first names, last names or company names.

It may not be necessary to speak a desired list element for each available set of list elements in the database. In other words, one or more sets of list elements may be optional.

Between the different sets of list elements, a relation or interrelation may exist. For example, a first set of list elements may comprise city names and a second set of list elements may comprise street names. In this case, the street names may be related to or associated with one or more city names of the first set of list elements, in which the streets can be found.

Similarly, in an address or telephone system, telephone numbers comprised in a second set of list elements may be related to the respective personal names present in a first set of list elements. Furthermore, different sets of list elements may correspond to different levels of a hierarchy. The set of city names, for example, corresponds to a higher hierarchical level than the set of street names.

The first set and the second set may correspond to different categories. For example, a first category may correspond to a category 'city names' and a second category may correspond to a category 'street names'.

Figure 1:
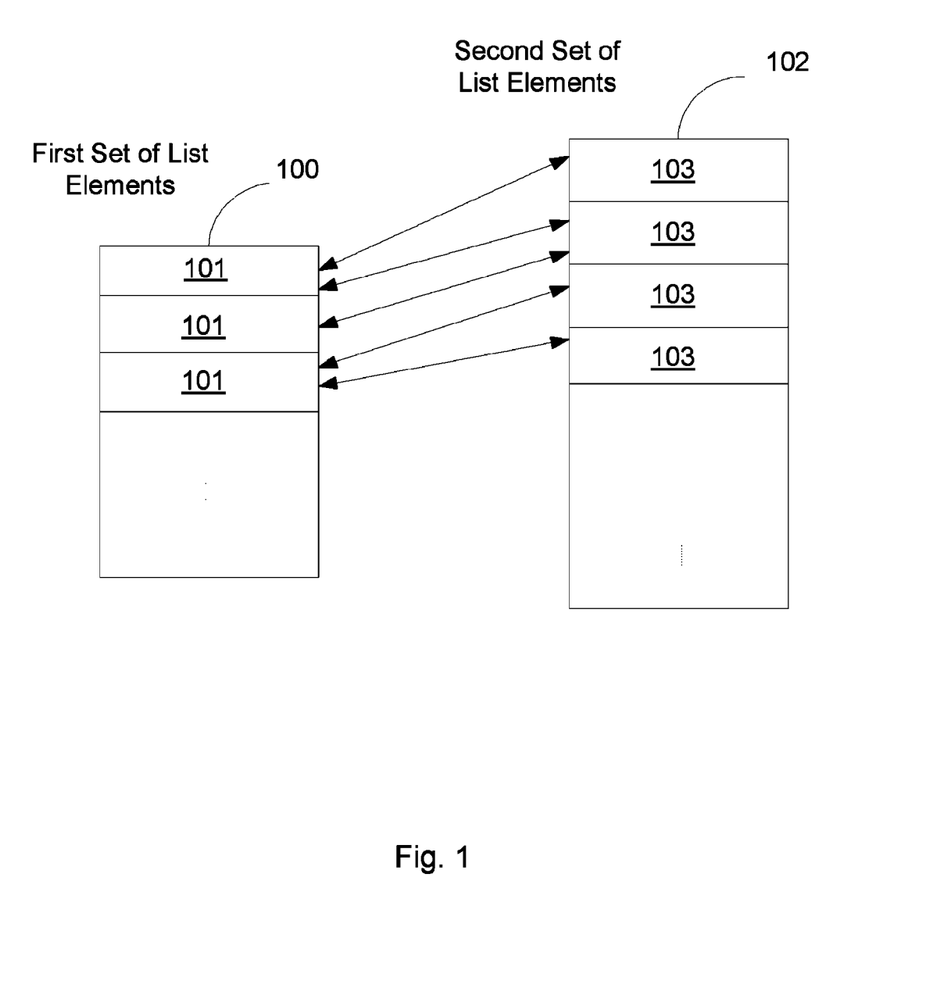
FIG. 1 illustrates an example of a first and a second set of list elements.

FIG. 1 illustrates an example of a first set of list elements 100 and a second set of list elements 102. The first set of list elements may comprise a plurality of list elements 101 and the second set of list elements 102 may comprise a plurality of list elements 103. By way of example, it is assumed that the first set of list elements 100 comprises city names and the second set of list elements 102 comprises street names. It is to be understood, however, that this example is not intended as limitation but serves as example illustrating features and advantages of the invention.

The first set of list elements 100 and the second set of list elements 102, may be related to each other. In particular, each list element 103 of the second set of list elements 102 may be related to one or more list elements 101 of the first set of list elements 100. In FIG. 1, these relations are illustrated by the double headed arrows between the first set 100 and the second set 102. Such relations may be utilized for a speech recognition method for selecting a combination of list elements via a speech input. For example, a street name in the second set may be associated with at least one city name of the first set, wherein the street can be found in that city.

Figure 2:
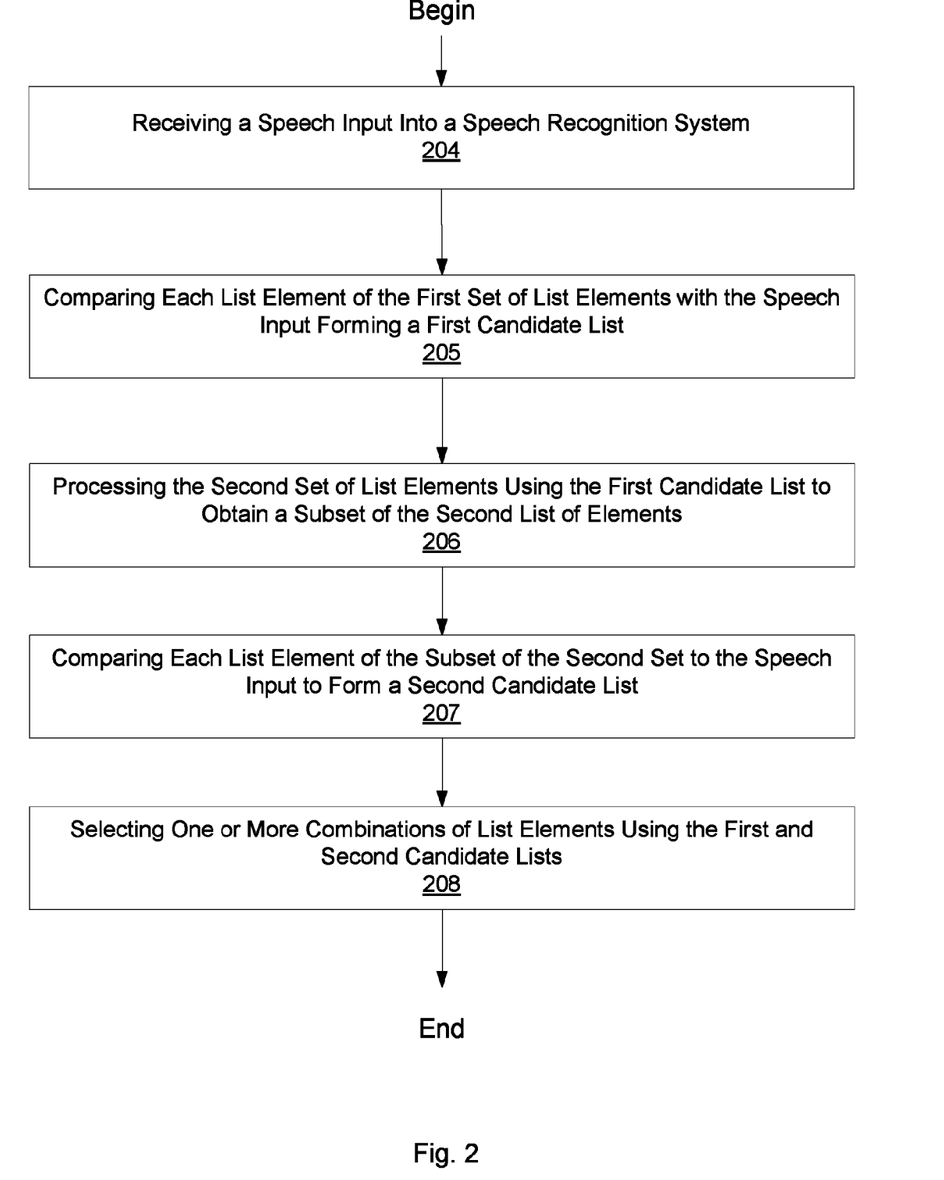
FIG. 2 illustrates a flow chart of a speech recognition method for selecting a combination of list elements.

FIG. 2 illustrates, in form of a flow chart, an example of a speech recognition method for selecting a combination of list elements via a speech input. In particular, in step 204, a speech input may be received. The speech input may be based on a speech signal originating from a user. For example, the speech signal originating from a user may be received by one or more microphones. The received speech signal may be processed to reduce or eliminate unwanted environmental noises or echoes.

A speech recognition unit may be configured such as to recognize sub-word units, for example, phonemes, in the received speech signal, in particular using an open phoneme loop. An example for such a speech recognition unit may comprise an artificial neural network. Alternatively or additionally, the speech recognition unit may utilize Hidden Markov models. A speech input corresponding to a sequence or a string of sub-word units such as phonemes may be determined. The string of sub-word units may be mapped to a string of symbolic representations of the sub-word units. The speech input may correspond to the string of sub-word units or to the string of symbolic representations of the sub-word units.

At step 205, each list element of the first set of list elements may be compared with the speech input. Based on the comparison result, a first candidate list of best matching list elements may be obtained. The list elements of the first set may be provided in the same form as the speech input. For example, if the speech input corresponds to a string of phonemes, the list elements of the first set may be provided as a phoneme string as well. For that purpose, list elements of the first set may be phonetically transcribed. If the speech input corresponds to a phoneme string and the list elements of the first set are represented by letter sequences, the phoneme string may be mapped to a letter sequence or string.

In order to determine the degree to which a list element of the first set matches the speech input, comparing each list element may comprise determining a score for each list element of the first set. The score may be normalized. The list elements of the first set may be ranked according to the score. The first candidate list may comprise list elements of the first set having a score above a predetermined threshold. Alternatively, a maximum number, m, may be fixed and the m best fitting list elements of the first set may be selected for the first candidate list.

Comparing each list element of the first set and/or of the subset of the second set with the speech input may correspond to a spotting-type match of the list elements against the speech input.

For comparing each list element with the speech input, wildcard symbols may be used. For example, in order to model a user speaking an utterance starting with a city name, every city of the first set may be extended by a wildcard symbol on the right side. For instance, "London" may be extended to "London*", where the symbol '*' denotes a wildcard symbol (for ease of reading the orthographic descriptions are used). The list of all wildcard symbol extended cities may thus be compared to or matched against the phoneme string corresponding to the speech input.

At step 206, the second set of list elements is being processed using the first candidate list. For example, all street names belonging to at least one of the cities from the first candidate list may be selected thereby obtaining a subset of the second set.

The number of list elements in the subset of the second set may be smaller than the number of list elements in the second set. In this way, the original size of the second set is reduced by taking advantage of the relation between the first set and the second set. In this way, for example, the street names may be searched more efficiently.

At step 207, each list element of the subset of the second set may be compared with the speech input. In particular, only the list elements of the subset are compared with the speech input while the list elements of the second set, which are not comprised in the subset, may be bypassed. Every list element of the subset, for example, every street element of the subset, may get the score from the best scored of the associated cities as a starting score. This can be relevant for determining the second candidate list and for improved pruning performance. For this comparing step, the placement of the wildcard symbols may be different from the placement of the wildcard symbols at step 205.

For example, the street element may be spoken in the middle of a user's utterance. In this case, both sides of the list element of the subset require a wildcard symbol. If it was known that the last part of the speech input corresponds to or is associated with a street element, i.e. with the category 'street name', one wildcard symbol to the left would be sufficient. Based on the comparison results, a second candidate list of best matching list elements may be obtained. The second candidate list may correspond to a k-best list of street names and their associated score. In other words, the second candidate list may comprise a maximum number, k, of list elements of the subset of the second set.

At step 208 one or more combinations of list elements may be selected using the first and the second candidate lists. For example, first the street scores of the list elements of the second candidate list may be reduced by the city offset or starting score calculated at step 206. Then, all city street combinations still viable are scored. The question which city street combinations are viable depends on the first candidate list and the second candidate list. In particular, only city street combinations comprising a list element of the first candidate list and a related list element of the second candidate list may be viable.

A simple method for combining the scores would be to just add the scores (e.g. the city score from step 205 and the street score from step 207). More advanced methods might incorporate additional information such as approximate segmentation information provided by the spotting-type matching of the comparing steps 205 and 207, respectively. For example, combinations for which the city wildcard covers the street name and/or the street wildcard covers the city name may be associated with a higher score.

Combinations resulting in too long overlaps of city and street elements or too wide gaps between city and street elements may be associated with a lower score. In this way, a result list may be obtained, wherein the result list may correspond to an n-best list of the city street combinations.

Figure 3:
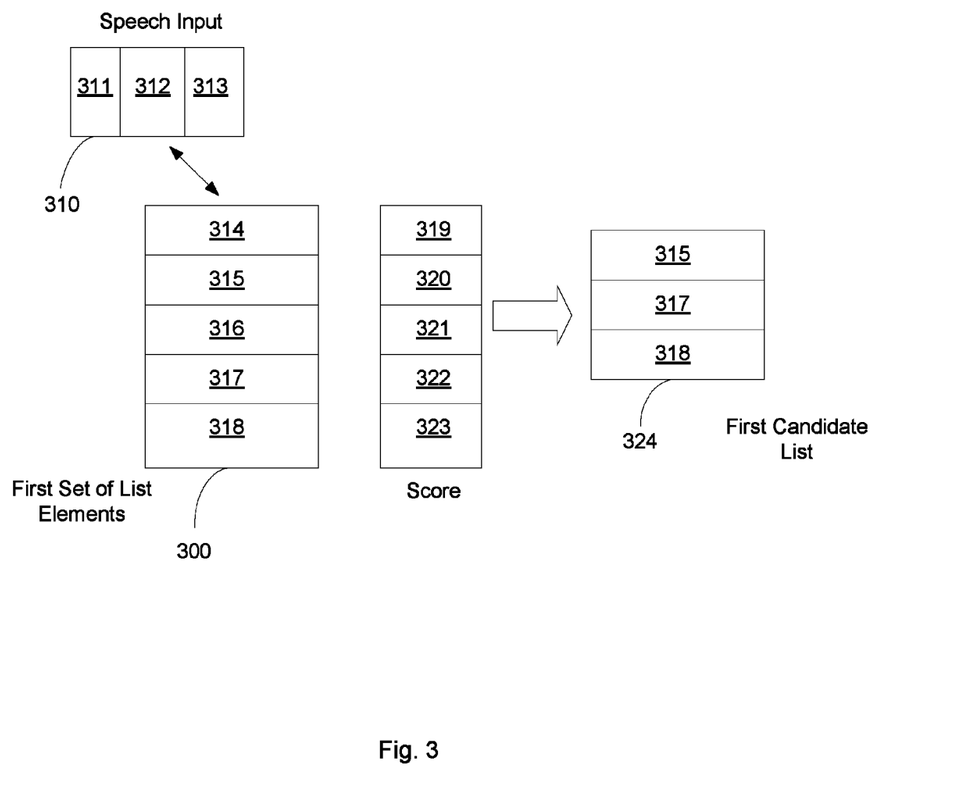
FIG. 3 illustrates an example of a speech input, a first set of list elements and a first candidate list.

FIG. 3 further illustrates step 205. In particular, FIG. 3 shows an example of a speech input 310, which comprises three parts 311, 312 and 313, respectively. The first set of list elements 300 comprises list elements 314-318. When comparing each list element of the first set 300 with the speech input 310, a score may be determined for each list element of the first set 300, indicating the agreement of the list element with the speech input 310 or a part of the speech input 311, 312 or 313. FIG. 3 shows the score 319 of list element 314, the score 320 of list element 315, the score 321 of list element 316, the score 322 of list element 317 and the score 323 of list element 318. Based on these scores, a first candidate list 324 is obtained. In particular, the first candidate list 324 comprises a maximum number of list elements, in this case, three. The list elements of the first candidate list 324 correspond to the best matching list elements of the first set 300. In other words, the list elements 315, 317 and 318 have a higher score than the list elements 314 and 316.

Figure 4:
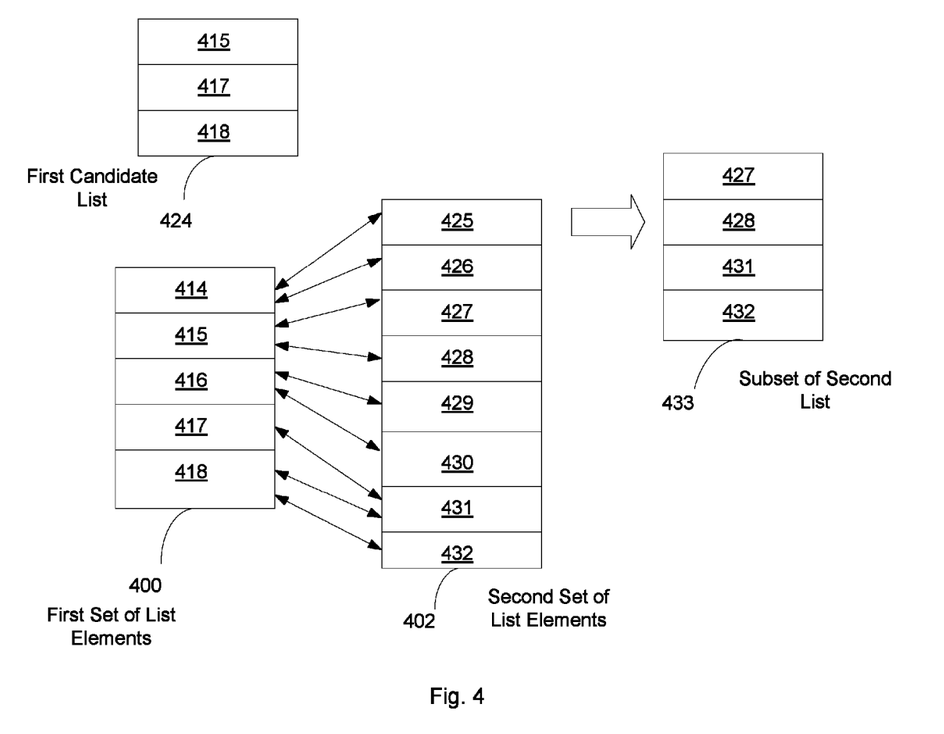
FIG. 4 illustrates an example of a first set of list elements, a second set of list elements, a first candidate list and a subset of the second set of list elements.

FIG. 4 further illustrates step 206. In particular, an example of a first candidate list 424 is shown, comprising exemplary list elements 415, 417 and 418. A first set of list elements 400 comprises list elements 414-418 and a second set of list elements 402 comprises list elements 425-432. Based on the relations between the first set 400 and the second set 402, as indicated by the arrows between the two sets, and based on the first candidate list 424, a subset 433 of the second set 402 may be obtained. In particular, the subset 433 comprises list elements 427, 428, 431 and 432 of the second set 402 which are related to one or more list elements 415, 417 and/or 418 of the first candidate list 424.

Figure 5:
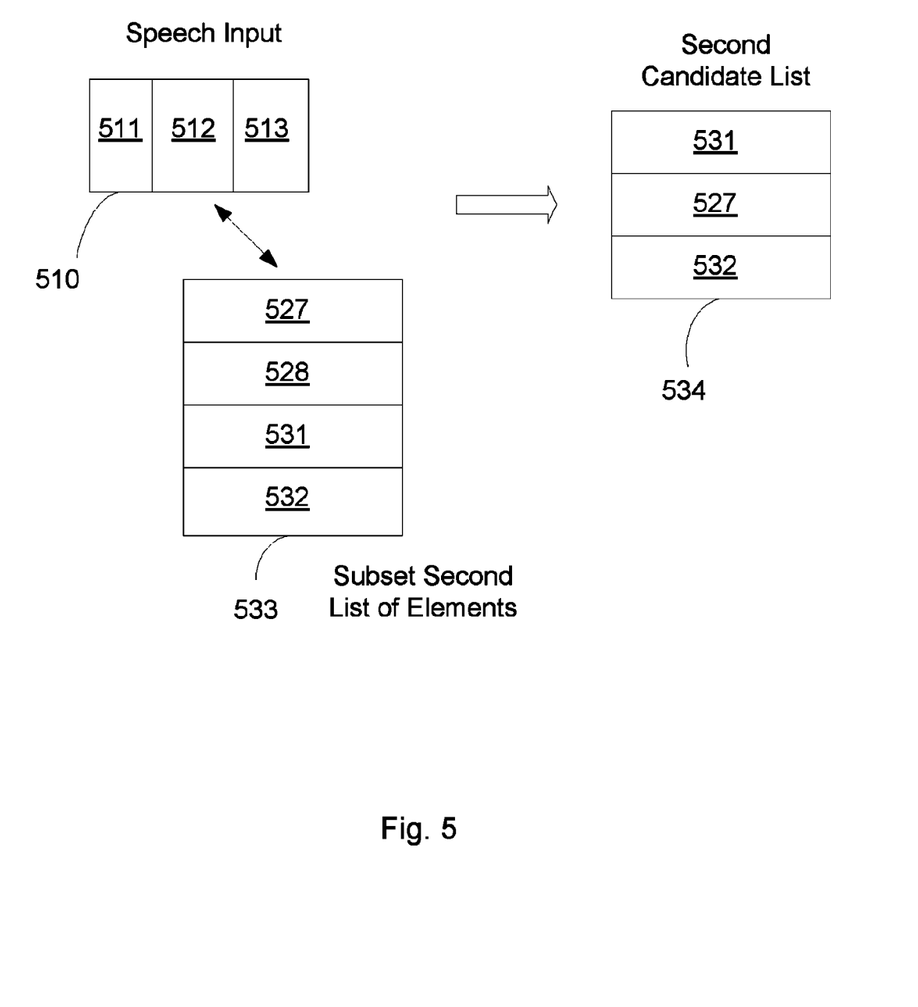
FIG. 5 illustrates an example of a subset of a second set of list elements, a speech input and a second candidate list.

FIG. 5 further illustrates step 207. In particular, an example of a speech input 510 and an example of a subset 533 of the second set of list elements are shown. Speech input 510 comprises parts 511, 512 and 513, in particular separated by silent pauses and/or prosodic features, and the subset 533 of the second set comprises list elements 527, 528, 531 and 532. By comparing each list element of the subset 533 with the speech input 510, a second candidate list 534 may be obtained, comprising exemplary list elements 531, 527 and 538.

Figure 6:
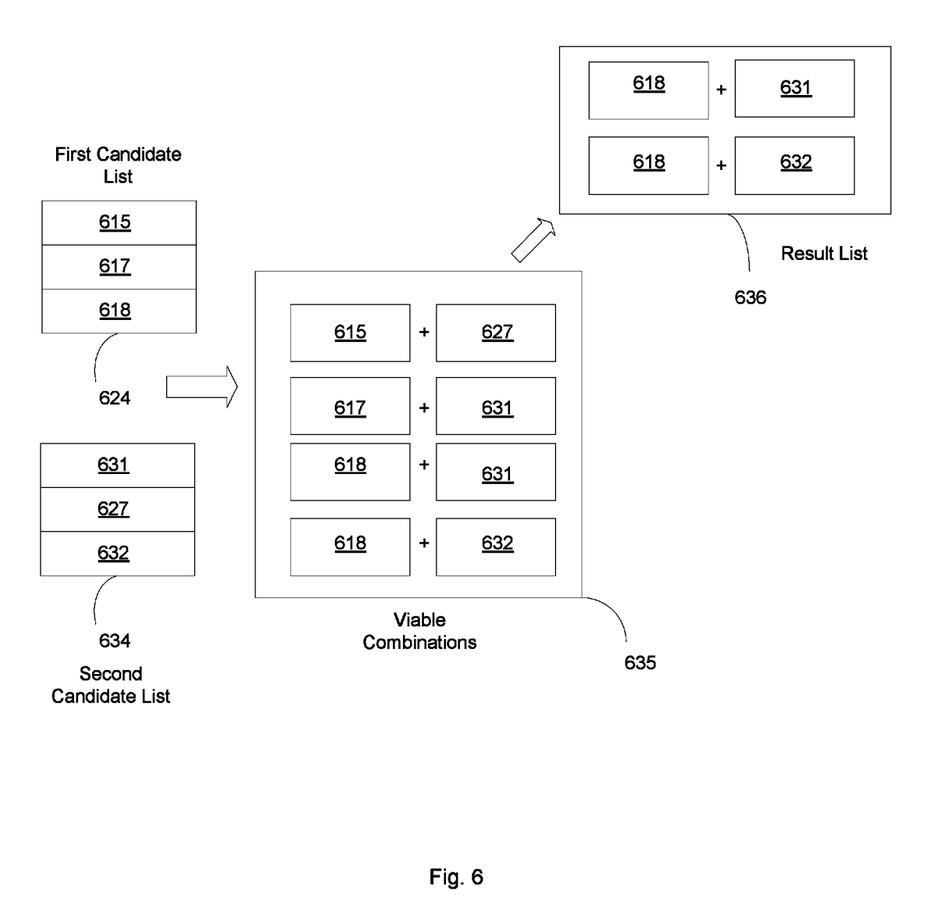
FIG. 6 illustrates an example of a first and a second candidate list and a result list.

FIG. 6 further illustrates step 208. In particular, an example of a first candidate list 624 and an example of a second candidate list 634 are shown. The first candidate list 624 comprises list elements 615, 617 and 618, and the second candidate list 634 comprises list elements 631, 627 and 632. Although, in this example, the first candidate list 624 and the second candidate list 634 comprise an equal number of list elements, the number of list elements of the first candidate list and the second candidate list may differ from each other. Next, all still viable combinations 635 may be scored to obtain a result list 636.

Step 208 may be followed by an additional matching step. In particular, the list elements of the result list may be compared with the speech input to obtain a pruned result list, in particular, wherein the pruned result list comprises less list elements than the result list.

The user only speaking a list element of the first set, e.g. only speaking a city name, may be emulated by adding an "empty street", i.e. a neutral list element, to the second set. In this way, the absence of a list element of the second set in the speech input may be compensated.

Different placements of spoken list elements in the speech input may be considered by the positioning of the one or more wildcard symbols used for the comparing steps. For example, if a part of the speech input corresponding to a street element is arranged on the left hand side of the part associated with a city element, the city wildcard may be placed on the left side of the list elements of the first set. To allow for an arbitrary order of the city element and the street element, a wildcard may be put on both sides of the list elements of the first set. Alternatively, each list element of the first set may be first compared with the speech input by extending a wildcard to the left and subsequently by a wildcard on the right. The score of the two comparison results may be combined, for example, by using the better of the two scores. Due to the typically low number of cities, this is usually computationally not expensive. In this case, the step of comparing each list element of the subset of the second set may require to extend a list element of the subset of the second set by a wildcard on both sides.

To handle more than two sets of list elements an iterative application of steps 205-208 may be performed.

Step 208 may be followed by using a further speech recognizer on the result list to obtain a pruned result list. To allow for additional words, (e.g. downtown), which are not part of the database (i.e. which are not part of the sets of list elements), the further speech recognizer may be extended with additional entries in grammar. This may include so-called 'filler words', which may not be important for the application. In this way, for example, a user may say "I would like to go to downtown Munich".

The sets of list elements may be comprised in a database. To improve the computational efficiency of the methods, the database may be split into a plurality of sets of list elements, using a short column or an ordering set as an ordering key. In particular, each set of list elements may be associated with a keyword. The ordering set may comprise the keywords of the sets of list elements.

For example, instead of using a single set of list elements for all US cities and a single set of list elements for all US city street names, one may use several US state specific sets. The step of receiving the speech input may then be followed by spotting list elements of the ordering list, (e.g. US state names) in the speech input. In this way, the speech recognition method may select a suitable first and second set of list elements (e.g. look only for addresses in California).

In the same way, as a further example, addresses of separate countries with different spoken languages may be recognized using a single speech input, (e.g. all addresses of Europe). In this case, an ordering set may comprise country names. After determining the spoken country by comparing the list elements of the ordering set with the speech input, the speech input may be processed based on the spoken language of the country.

In the speech input, parts of the speech input associated with different categories of list elements or spoken list elements may be separated by silent pauses. Alternatively, there may be no silent pauses between spoken list elements, but prosodic features. In other words, prosodic features may be used to predict boundaries between spoken list elements, i.e. between parts of the speech input associated with different categories of differing sets of list elements. In this way, the overall recognition rate may be improved, as it is expected that users will mark the passage between the end of a list element and the beginning of the following list element in intonation. A pattern classifier trained on prosodic features may be used to realize the detection of such boundaries.

Optionally, the user may be requested to speak list elements according to different categories separately, for example, first the city name and then the street name. The recognition approach for selecting a combination of list elements may work as described above, however, no wildcard symbols may be necessary. For example, the user may be requested to speak the city name and phoneme string A representing the city name is generated. Afterwards, the user may be requested to speak the street name and a phoneme string B representing the street name may be generated. In this case, step 205 may be executed without any wildcard symbols using phoneme string A. Step 207 may be executed without any wildcard symbols as well, but phoneme string B is used instead. Steps 206 and 208 may be maintained unchanged.

The sizes of the first candidate list, the second candidate list, the result list and/or the pruned result list may be adapted according to the length of the speech input. The longer the utterance associated with the speech input, the longer the phoneme string generated, the more computing time will be usually required especially for steps 205 and 207. On the other hand, longer addresses may be more unique, i.e. there are typically less similar addresses for long addresses than for short addresses. Therefore, for a long speech input, the maximum number of list elements in the first candidate list, the second candidate list, the result list and/or the pruned result list may be reduced. This may save computational resources while not reducing the accuracy of the method.

For step 208, additional a priori knowledge may be used. For example, rewards may be integrated during the combination of scores to improve recognition or selection of more likely combinations. For example, addresses nearby the current location, addresses recently driven to, addresses contained in address books, or the like could in this way get a higher score. Similarly, for another application, music tracks recently played, rated higher than others or contained in manual play lists may be rewarded during the combination of scores.

In the case of a navigation system, it may be the case that streets belong to districts of a city as well as to the city itself. It can also happen that phonetic alternatives of city names are present which contain the same street names. In such a case, a number of street groups may be generated. The street groups may represent either already existing superset cities or produce new "pseudo cities" or subset cities. The subset cities may correspond to list elements of a further set of list elements.

To minimize memory requirements, city street combinations may be stored in the data only for the subset city but not for the superset city. In other words, a list element of the street set may be related to a superset city only via a subset city.

For example, city A may be a district of city B and the street C happens to be in both of them, then street C may only be related to the district A but not to the city B. This scheme may be used recursively. If, for example, a country D exists, in which the city B is located, then DC will not be stored explicitly in the data (although the user may speak DC). Instead, only the combination AC may be stored. In this hypothetical example, the following combinations may be spoken DC, BC and AC. The city matching provides the following scores where * is a wildcard and a lower score is preferred to a higher score:

D*10
B*80
A*150

After the city matching, the subset cities, i.e. the list elements of the further set of list elements, may be added to the city list, i.e. to the first candidate list. At first, they may get the worst possible score. Then, for all cities X which are subset of city Y, the score may be temporarily adjusted so that city X gets a better score out of the score for X and the score for Y. This may be done iteratively and/or recursively until all relevant subset relations are considered. After step 208, all scores of the resulting city street combinations may be corrected.

For example, the speech input may comprise the combination DC. This combination may be represented in the result list only indirectly by AC. This may be unraveled so that AC gets the correct score for AC (for example, if D had the best score out of A, B, D, subtract the score for D and add the score for A). In the result list, BC and DC are then added to the set of city street combinations and scored accordingly. As a numerical example, the temporarily changed city scores are as follows:

D 10
B 10
A 10

Then the city-street combinations temporarily get the following scores:

*C −300 (wildcard street score)
DC −290 (10-300)
BC −290 (10-300)
AC −290 (10-300)

Then the city-street combinations are corrected and receive these scores:

$$DC -290\ (temp\_score\ (AC) + score\ (D^*) - score\ (D^*))$$

$$BC -220\ (temp\_score(AC) + score\ (B^*) - score\ (D^*))$$

$$AC -150\ (temp\_score(AC) + score\ (A^*) - score\ (D^*))$$

In this way, the data storage requirements may be reduced. Additionally, of all the possible city street combinations, many may not have to be traversed or scored explicitly. Therefore, the expansion of the remaining city street combinations may be computed faster due to their typically relatively low number.

Figure 7:
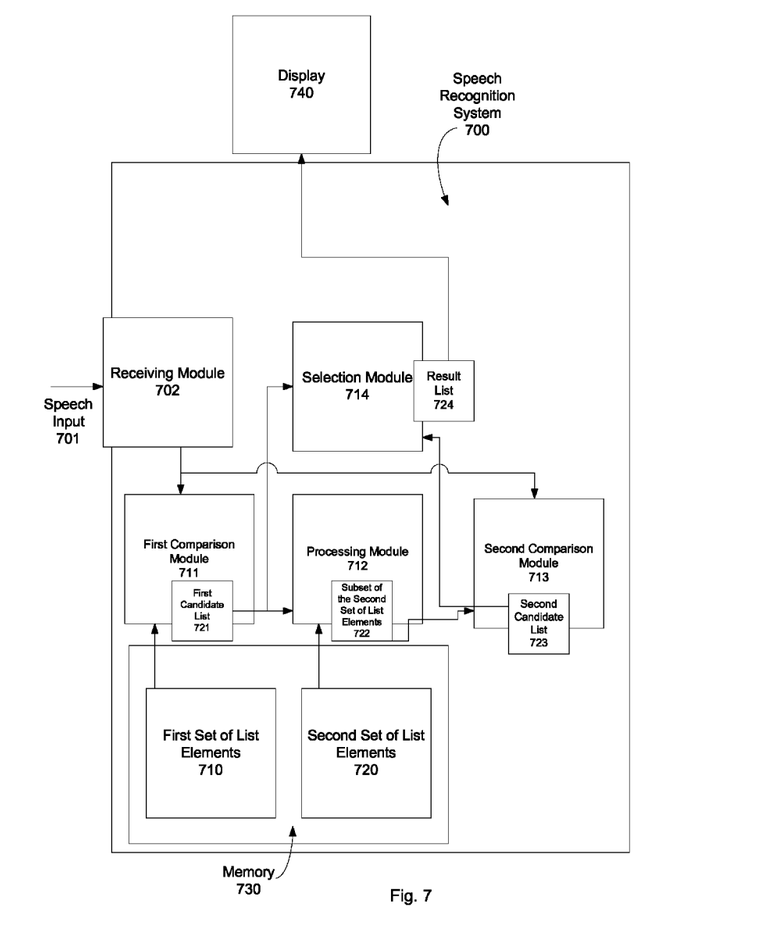
FIG. 7 illustrates an example of an apparatus for implementing the described methods.

As expressed above, the methodology of the present invention may be embodied in a speech recognition system. The speech recognition system 700 may include a plurality of modules as shown in FIG. 7. The modules may be hardware implementations, such as separate circuit, for example, an ASIC (application specific integrated circuits) or may be a combination of hardware (e.g. circuitry) and software stored in associated memory (e.g. firmware). The first module is a receiving module 702 that receives in the speech input signal 701, buffers the signal 701 and passes the speech input signal 701 to a first comparison module 711 and a second comparison module 713. The first comparison module 711 retrieves from memory 730 a first set of list elements 710 and compares the set to the speech input 701 to determine a first candidate list of best matching elements 721. The first candidate list 721 is passed by the first comparison module 711 to a processing module 712 and also to a selection module 714. The processing module 712 retrieves from memory 730 the second set of list elements 720 and uses the first candidate list 721 to determine a subset of the second set of list elements 722. The processing module 712 may make this determination through identification of any linkages between the first candidate list 721 and the second set of list elements 720. A linkage is an association between list elements from different lists. The processing module 721 forwards the subset of the second set of list elements 722 to the second comparison module 713. The second comparison module 713 compares the subset of the second list elements 722 to the speech input 701 to identify a second candidate list 723 that are best matches with at least a portion of the speech input. The second comparison module 713 passes the second candidate list 723 to the selection module 714. The selection module 714 identifies list elements that are related between the first candidate list 721 and the second candidate list 723. The selection module 714 outputs a result list 724 of the best matches of related elements between the first and the second candidate lists providing the result list to a display 740 for viewing by a user of the system, such as the speaker of the speech input 701. The selection module 714 determines these related combinations elements by scoring each determined combination by combining the score of the list element of the first candidate list 721 and the score of the related list element of the second candidate list 723. The result list 724 comprises best matching combinations of a list element of the first set of list elements and a list element of the second set of list elements. In other embodiments, the result list may be audibly played through a speaker, so that the user of the system can hear the result list.

Although, previously discussed embodiments of the present invention have been described separately, it is to be understood that some or all of the above described features can also be combined in different ways. The discussed embodiments are not intended as limitations but serve as examples illustrating features and advantages of the invention.

The embodiments of the invention described above are intended to be merely exemplary; numerous variations and modifications will be apparent to those skilled in the art. All such variations and modifications are intended to be within the scope of the present invention as defined in any appended claims.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A computer-implemented speech recognition method for selecting a combination of list elements via a speech input having a first portion and a second portion, wherein a first list element of the combination is part of a first set of list elements and a second list element of the combination is part of a second set of list elements, the method comprising:

receiving at a processor the speech input;

comparing within the processor each list element of the first set of list elements with the first portion of the speech input to obtain a first candidate list of best matching list elements;

processing the second set of list elements using the first candidate list to obtain a subset of the second set of list elements;

comparing each list element of the subset of the second set of list elements with the second portion of the speech input to obtain a second candidate list of best matching list elements; and selecting a combination of list elements using the first and the second candidate lists wherein selecting a combination of list elements comprises:

determining combinations of a list element of the first candidate list with a related list element of the second candidate list;

scoring each determined combination by combining the score of the list element of the first candidate list and the score of the related list element of the second candidate list;

determining a result list wherein the result list comprises best matching combinations of a list element of the first set of list elements and a list element of the second set of list elements; and comparing each combination of the result list with the speech input to determine a score for each combination, thereby obtaining a pruned result list, wherein the first candidate list, the second candidate list, the result list and the pruned result list comprise a maximum number of list elements, in particular wherein the maximum number of list elements of the first candidate list, the second candidate list, the result list and the pruned result list are determined based on the length of the speech input.

2. The method according to claim 1, wherein one or more list elements of the second set of list elements are related to at least one list element of the first set of list elements.

3. The method according to claim 2, wherein processing the second set comprises selecting only list elements from the second set which are related to one or more list elements of the first candidate list.

4. The method according to claim 1, wherein the first set and the second set correspond to different levels of a hierarchy of sets.

5. The method according to claim 1, wherein the first candidate list is a subset of the first set or wherein the second candidate list is a subset of the second set.

6. The method according to claim 1, wherein the first set and the second set correspond to different categories, in particular, wherein each list element of the first set corresponds to a first category and each list element of the second set corresponds to a second category.

7. The method according to claim 1, wherein comparing the list elements of the first set and/or the list elements of the subset of the second set with the speech input comprises determining for each list element of the first set and/or of the subset of the second set a score.

8. The method according to claim 1, wherein for comparing the list elements of the first set and the list elements of the subset of the second set with the speech input, each list element of the first set is extended by at least one wildcard symbol.

9. The method according to claim 1, wherein scoring each determined combination comprises adding the score of the list element of the first candidate list and the score of the related list element of the second candidate list.

10. The method according to claim 1, wherein the step of receiving the speech input is followed by providing the first and the second set of list elements, wherein providing the first and the second set comprises selecting the first and the second set from a database based on the speech input.

11. A computer program product, tangibly embodied in a non-transitory computer-readable storage medium, the computer program product including instructions operable to cause a data processing apparatus to select a combination of list elements via a speech input having a first portion and a second portion, wherein a first list element of the combination is part of a first set of list elements and a second list element of the combination is part of a second set of list elements, the computer program product further including instructions operable to cause the data processing apparatus to:
receive the speech input;
compare each list element of the first set of list elements with the first portion of the speech input to obtain a first candidate list of best matching list elements;
process the second set of list elements using the first candidate list to obtain a subset of the second set of list elements;
compare each list element of the subset of the second set of list elements with the second portion of the speech input to obtain a second candidate list of best matching list elements; and
select a combination of list elements using the first and the second candidate lists by:
determining combinations of a list element of the first candidate list with a related list element of the second candidate list;
scoring each determined combination by combining the score of the list element of the first candidate list and the score of the related list element of the second candidate list;
determining a result list wherein the result list comprises best matching combinations of a list element of the first set of list elements and a list element of the second set of list elements; and
comparing each combination of the result list with the speech input to determine a score for each combination, thereby obtaining a pruned result list, wherein the first candidate list, the second candidate list, the result list and the pruned result list comprise a maximum number of list elements, wherein the maximum number of list elements of the first candidate list, the second candidate list, the result list and the pruned result list are determined based on the length of the speech input.

12. The computer program product according to claim 11, wherein one or more list elements of the second set of list elements are related to at least one list element of the first set of list elements.

13. The computer program product according to claim 12, wherein processing the second set comprises selecting only list elements from the second set which are related to one or more list elements of the first candidate list.

14. The computer program product according to claim 11, wherein the first set and the second set correspond to different levels of a hierarchy of sets.

15. The computer program product according to claim 11, wherein the first candidate list is a subset of the first set or wherein the second candidate list is a subset of the second set.

16. The computer program product according to claim 11, wherein the first set and the second set correspond to different categories wherein each list element of the first set corresponds to a first category and each list element of the second set corresponds to a second category.

17. The computer program product according to claim 11, wherein the computer code for comparing the list elements of the first set comprises computer code for determining for each list element of the first set a score.

18. The computer program product according to claim 11, wherein the computer code for comparing the list elements of the first set and the list elements of the subset of the second set with the speech input, each list element of the first set is extended by at least one wildcard symbol.

19. The computer program product according to claim 11, wherein the computer code for scoring each determined combination comprises computer code for adding the score of the list element of the first candidate list and the score of the related list element of the second candidate list.

20. The computer program product according to claim 11, wherein the computer code for receiving the speech input is followed by computer code for providing the first and the second set of list elements, wherein providing the first and the second set comprises computer code for selecting the first and the second set from a database based on the speech input.

21. An apparatus for speech recognition for automatically selecting a combination of list elements via a speech input having a first portion and a second portion, wherein a first list element of the combination is part of a first set of list elements and a second list element of the combination is part of a second set of list elements, the apparatus comprising:

- a receiving module for receiving, at a processor, the speech input;
- a first comparison module for comparing list elements of the first set of list elements with the first portion of the speech input to form a first candidate list;
- a processing module for processing the second set of list elements using the first candidate list to produce a subset of the second set of list elements;
- a second comparison module for comparing list elements of the subset of the second set with the second portion of the speech input to form a second candidate list; and
- a selection module for selecting a combination of list elements wherein selecting a combination of list elements requires:

determining combinations of a list element of the first candidate list with a related list element of the second candidate list;

scoring each determined combination by combining the score of the list element of the first candidate list and the score of the related list element of the second candidate list;

determining a result list wherein the result list comprises best matching combinations of a list element of the first set of list elements and a list element of the second set of list elements; and comparing each combination of the result list with the speech input to determine a score for each combination, thereby obtaining a pruned result list, wherein the first candidate list, the second candidate list, the result list and the pruned result list comprise a maximum number of list elements, wherein the maximum number of list elements of the first candidate list, the second candidate list, the result list and the pruned result list are determined based on the length of the speech input.

* * * * *